US006820470B2

(12) United States Patent
Shidara et al.

(10) Patent No.: US 6,820,470 B2
(45) Date of Patent: Nov. 23, 2004

(54) INTAKE MANIFOLD LEAKAGE DETECTION SYSTEM OF INTERNAL COMBUSTION ENGINE

(75) Inventors: Sadafumi Shidara, Wako (JP); Nobuhiro Takahashi, Takanezawa-machi (JP)

(73) Assignees: Honda Giken Kogyo Kabushiki Kaisha, Tokyo (JP); Keihin Corporation, Tokyo (JP)

( * ) Notice: Subject to any disclaimer, the term of this patent is extended or adjusted under 35 U.S.C. 154(b) by 77 days.

(21) Appl. No.: 10/267,585

(22) Filed: Oct. 10, 2002

(65) Prior Publication Data

US 2003/0106366 A1 Jun. 12, 2003

(30) Foreign Application Priority Data

Oct. 12, 2001 (JP) .................................... 2001-315853

(51) Int. Cl.[7] .......................... G01L 3/26; G01L 5/13; G01M 15/00

(52) U.S. Cl. ................................................ 73/117.3

(58) Field of Search ............................ 73/118.2, 118.1, 73/40.5 R; 123/680, 520, 65 B, 690; 60/277; 340/450.3

(56) References Cited

U.S. PATENT DOCUMENTS

| | | | | |
|---|---|---|---|---|
| 5,531,100 A | * | 7/1996 | Mezger et al. | 73/47 |
| 5,615,643 A | * | 4/1997 | Hill | 123/65 B |
| 5,617,722 A | * | 4/1997 | Takaku | 60/277 |
| 5,750,888 A | * | 5/1998 | Matsumoto et al. | 73/118.1 |
| 5,996,400 A | * | 12/1999 | Nishioka et al. | 73/40.5 R |
| 6,220,229 B1 | * | 4/2001 | Kawamura et al. | 123/520 |
| 6,427,527 B1 | * | 8/2002 | Langer | 73/118.1 |
| 6,487,892 B1 | * | 12/2002 | Ito et al. | 73/49.2 |
| 6,612,155 B1 | * | 9/2003 | Stergiou | 73/49.7 |
| 6,614,345 B2 | * | 9/2003 | Kimata et al. | 340/450.3 |
| 6,644,284 B2 | * | 11/2003 | Pfitz | 123/479 |

FOREIGN PATENT DOCUMENTS

| | | |
|---|---|---|
| JP | 2000-104621 | 4/2000 |

* cited by examiner

*Primary Examiner*—Edward Lefkowitz
*Assistant Examiner*—Octavia Davis
(74) *Attorney, Agent, or Firm*—Westerman, Hattori, Daniels & Adrian, LLP

(57) ABSTRACT

A system detecting leakage of an internal combustion engine having a secondary air passage, bypassing a throttle valve, at an air intake pipe connecting to the intake manifold and a secondary air control valve which regulates opening of the secondary air passage. In the system, when the changes in the absolute manifold pressure and the atmospheric pressure before and after the engine starts rotation, are small, it is determined that the intake manifold may possibly leak and should be monitored. Specifically, the opening of the secondary air passage is changed and the changes in the pressure, etc., before and after the opening is changed, are calculated and based thereon, it is determined whether the intake manifold, in fact, leaks. With this, it becomes possible to detect intake manifold leakage accurately with a simple configuration.

12 Claims, 6 Drawing Sheets

INTAKE MANIFOLD LEAKAGE DETECTION SYSTEM OF INTERNAL COMBUSTION ENGINE

BACKGROUND OF THE INVENTION

1. Field of the Invention

This invention relates to an intake manifold leakage detection system of an internal combustion engine, more particularly to an intake manifold leakage detection system of an internal combustion engine for an outboard motor.

2. Description of the Related Art

In an internal combustion engine, intake air sucked in an intake pipe flows into an intake manifold, injected with fuel at an appropriate location and resulting air-fuel mixture flows into a cylinder combustion chamber where it is ignited and burns to drive the piston. When the intake manifold leaks, air enters from the leakage and hence the combustion state becomes different from that desired.

In view of the above, Japanese Laid-Open Patent Application No. 2000-104621 teaches detecting leakage of intake manifold by detecting in-cylinder pressure of respective cylinders. Specifically, in this prior art technique, an average of the detected in-cylinder pressures is calculated, each difference between the average and detected pressures is then calculated and is compared with a threshold value, and when any cylinder's difference is found to exceed the threshold value, it is determined that a manifold portion connecting to that cylinder leaks.

However, this prior art requires pressure sensors installed in respective cylinders for detecting the in-cylinder pressure and hence, the configuration is disadvantageously complicated.

SUMMARY OF THE INVENTION

An object of the present invention is therefore to provide an intake manifold leakage detection system of an internal combustion engine which can accurately detect leakage of the intake manifold in a simple configuration.

For realizing this object, there is provided a system for detecting leakage of an intake manifold of an internal combustion engine having a secondary air passage, bypassing a throttle valve, at an air intake pipe connecting to the intake manifold and a secondary air control valve which regulates opening of the secondary air passage, comprising: engine starting determining means for determining whether the engine starts rotation; pressure detecting means for detecting intake manifold pressure and atmospheric pressure when the engine is determined not to start rotation; first change determining means for detecting the intake manifold pressure when the throttle valve is closed after the engine is determined to start rotation and for determining whether a change from the intake manifold pressure detected before the engine is determined to start rotation, is equal to or smaller than a predetermined first value; second change determining means for detecting the atmospheric pressure when the throttle valve is closed after the engine is determined to start rotation and for determining whether a change from the atmospheric pressure detected before the engine is determined to start rotation is equal to or smaller than a predetermined second value; manifold leakage possibility determining means for determining that the intake manifold may possibly leak when the change from the intake manifold pressure detected before the engine is determined to start rotation is equal to or smaller than the predetermined first value and the change from the atmospheric pressure detected before the engine is determined to start rotation is equal to or smaller than the predetermined second value; third change determining means for changing the opening of the secondary air passage by the secondary air control valve when it is determined that the intake manifold may possible leak and for determining whether a change of speed of the engine before and after the opening is changed, is equal to or smaller than a predetermined third value and a change of the intake manifold pressure before and after the opening is changed, is equal to or smaller than a predetermined fourth value; and manifold leaking determining means for determining that the intake manifold leaks when the change of speed of the engine is equal to or smaller than the predetermined third value and the change of the intake manifold pressure is equal to or smaller than the predetermined fourth value.

BRIEF DESCRIPTION OF THE DRAWINGS

The object and advantages of the invention will be made apparent with reference to the following descriptions and drawings, in which.

DETAILED DESCRIPTION OF THE PREFERRED EMBODIMENT

An intake manifold leakage detection system of an internal combustion engine according to an embodiment of the present invention will now be explained with reference to the attached drawings.

Figure 1:
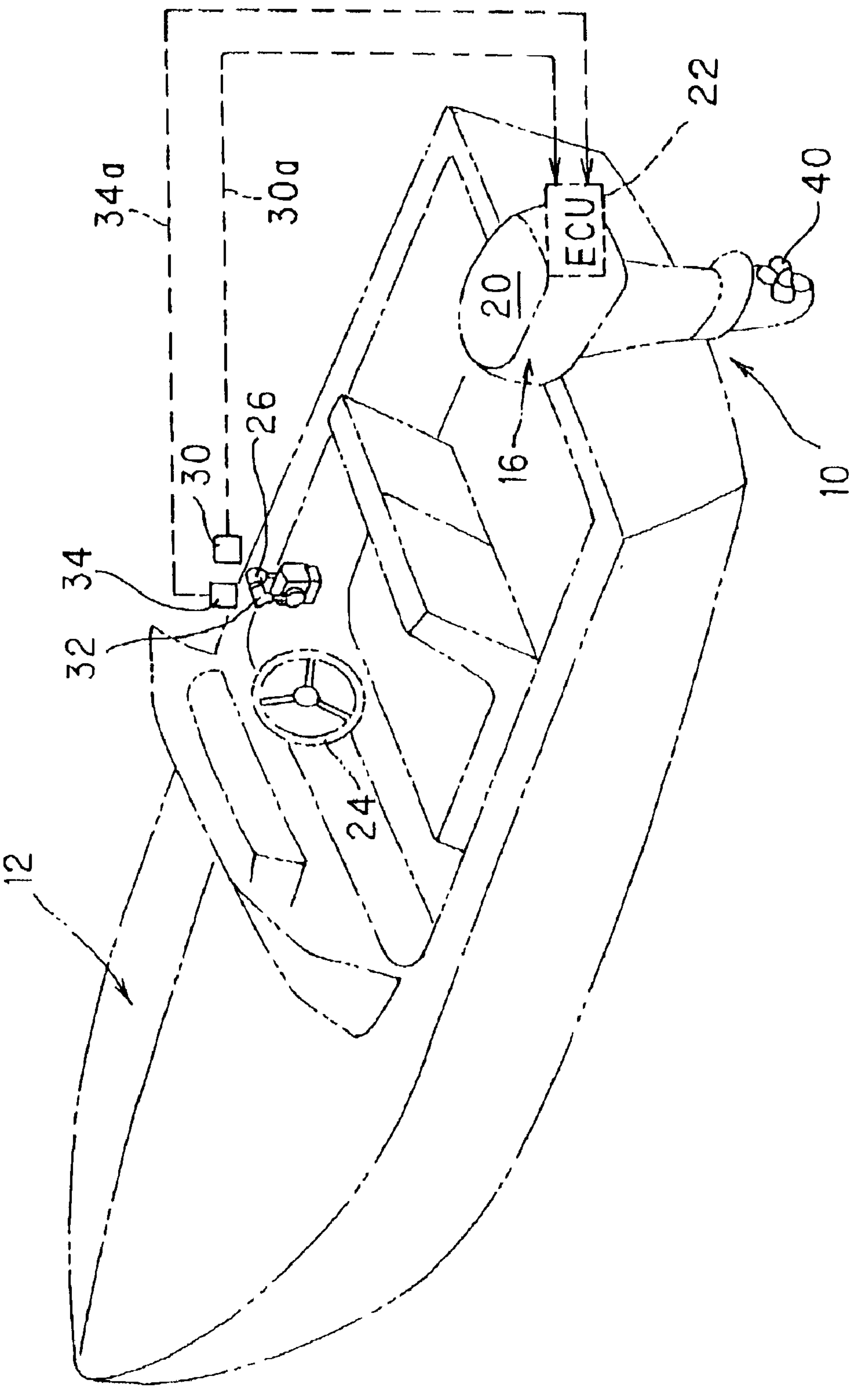
FIG. 1 is a schematic view showing the overall configuration of an intake manifold leakage detection system of an internal combustion engine embodied, for example, as that for an outboard motor, according to an embodiment of the present invention.

FIG. 1 is a schematic view showing the overall configuration of an intake manifold leakage detection system of an internal combustion engine embodied, for example, as that for an outboard motor, according to an embodiment of the present invention.

Reference numeral 10 in FIGS. 1 and 2 designates the aforesaid propulsion unit including an internal combustion engine, propeller shaft and propeller integrated into what is hereinafter called an "outboard motor." The outboard motor 10 is mounted on the stem of a boat (small craft) 12 by a clamp unit 14 (see FIG. 2).

Figure 2:
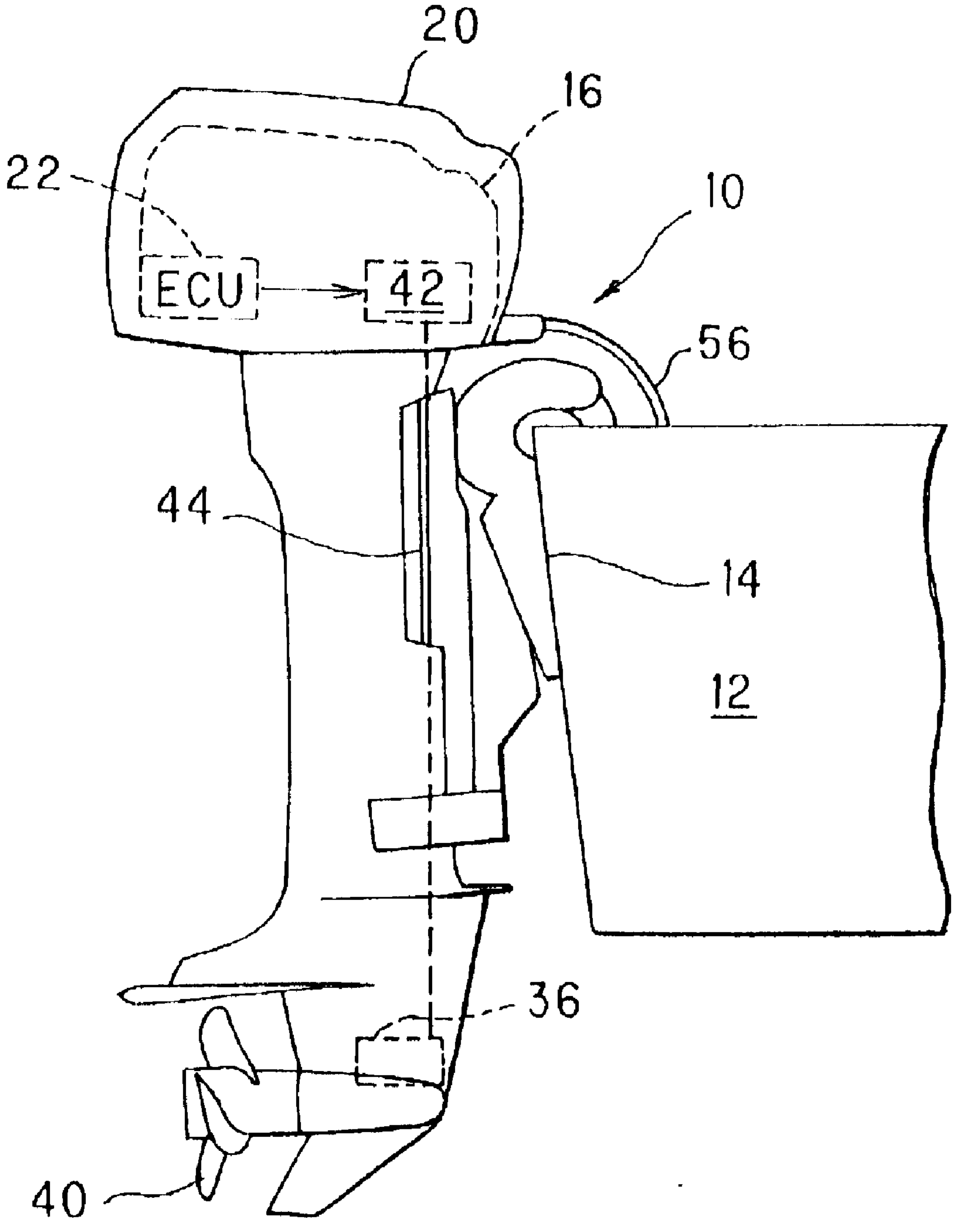
FIG. 2 is an enlarged side view of one portion of FIG. 1.

As shown in FIG. 2, the outboard motor 10 is equipped with the internal combustion engine (hereinafter called the "engine") 16. The engine 16 is a spark-ignition V-6 gasoline engine. The engine is positioned above the water surface and is enclosed by an engine cover 20 of the outboard motor 10. An electronic control unit (ECU) 22 composed of a microcomputer is installed near the engine 16 enclosed by the engine cover 20.

As shown in FIG. 1, a steering wheel 24 is installed in the cockpit of the boat 12. When the operator turns the steering wheel 24, the rotation is transmitted to a rudder (not shown) fastened to the stern through a steering system not visible in the drawings, changing the direction of boat advance.

A throttle lever 26 is mounted on the right side of the cockpit and near it is mounted a throttle lever position sensor 30 that outputs a signal corresponding to the position of the throttle lever 26 set by the operator.

A shift lever 32 is provided adjacent to the throttle lever 26 and next to it is installed a neutral switch 34 that outputs an ON signal when the operator puts the shift lever 32 in Neutral and outputs an OFF signal when the operator puts the shift lever 32 in Forward or Reverse. The outputs from the throttle lever position sensor 30 and neutral switch 34 are sent to the ECU 22 through signal lines 30*a* and 34*a*.

The output of the engine 16 is transmitted through a crankshaft and a drive shaft (neither shown) to a clutch 36 of the outboard engine 10 located below the water surface. The clutch 36 is connected to a propeller 40 through a propeller shaft (not shown).

The clutch 36, which comprises a conventional gear mechanism, is omitted from the drawing. It is composed of a drive gear that rotates unitarily with the drive shaft when the engine 16 is running, a forward gear, a reverse gear, and a dog (sliding clutch) located between the forward and reverse gears that rotates unitarily with the propeller shaft. The forward and reverse gears are engaged with the drive gear and rotate idly in opposite directions on the propeller shaft.

The ECU 22 is responsive to the output of the neutral switch 34 received on the signal line 34*a* for driving an actuator (electric motor) 42 via a drive circuit (not shown) so as to realize the intended shift position. The actuator 42 drives the dog through a shift rod 44.

When the shift lever 32 is put in Neutral, the engine 16 and the propeller shaft are disconnected and can rotate independently. When the shift lever 32 is put in Forward or Reverse position, the dog is engaged with the forward gear or the reverse gear and the rotation of the engine 16 is transmitted through the propeller shaft to the propeller 40 to drive the propeller 40 in the forward direction or the opposite (reverse) direction and thus propel the boat 12 forward or backward.

The engine 16 will now be explained with reference to FIGS. 3 and 4.

Figure 3:
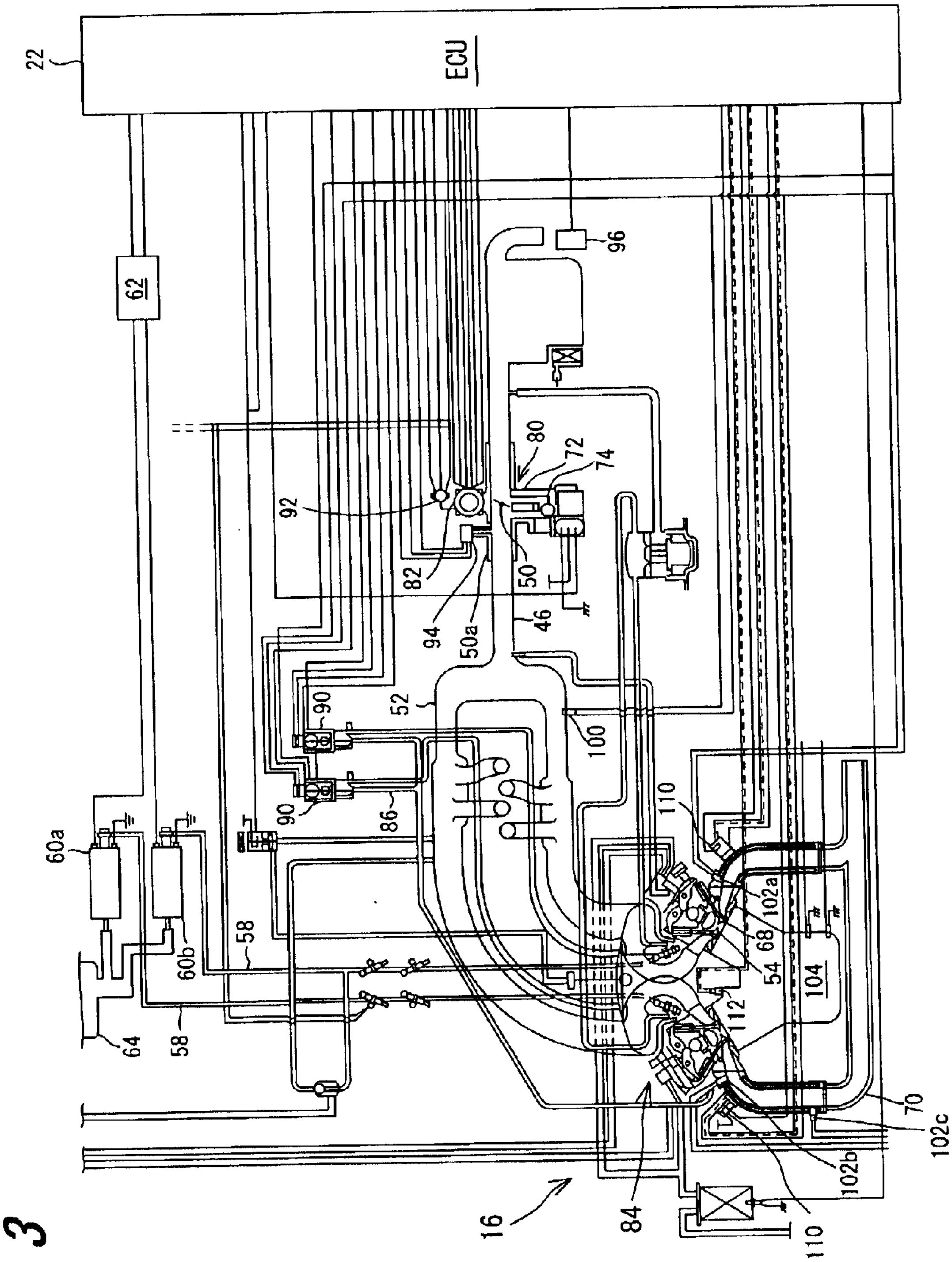
FIG. 3 is a schematic diagram showing details of the engine of the motor shown in FIG. 1.

As shown in FIG. 3, the engine 16 is equipped with an air intake pipe 46. Air drawn in through an air cleaner (not shown) is supplied to intake manifolds 52 provided one for each of left and right cylinder banks disposed in V-like shape as viewed from the front, while the flow thereof is adjusted by a throttle valve 50, and finally reaches an intake valves 54 of the respective cylinders. An injector 56 (not shown in FIG. 3) is installed in the vicinity of each intake valve (not shown) for injecting fuel (gasoline).

The injectors 56 are connected through two fuel lines 58 provided one for each cylinder bank to a fuel tank (not shown) containing gasoline. The fuel lines 58 pass through separate fuel pumps 60*a* and 60*b* equipped with electric motors (not shown) that are driven via a relay circuit 62 so as to send pressurized gasoline to the injectors 56. Reference numeral 64 designates a vaporized fuel separator.

The intake air is mixed with the injected gasoline to form an air-fuel mixture that passes into the combustion chamber (not shown) of each cylinder, where it is ignited by a spark plug 66 (not shown in FIG. 3) to burn explosively and drive down a piston (not shown). The so-produced engine output is taken out through a crankshaft. The exhaust gas produced by the combustion passes out through exhaust valves 68 into exhaust manifolds 70 provided one for each cylinder bank and is discharged to the exterior of the engine.

As illustrated, a branch passage 72 for secondary air supply is formed to branch off from the air intake pipe 46 upstream of the throttle valve 50 and rejoin the air intake pipe 46 downstream of the throttle valve 50. The branch passage 72 is equipped with an electronic secondary air control valve (EACV) 74. The EACV 74 is connected to the ECU 22. The ECU 22 calculates a current command value ICMD and supplies it to the EACV 74 so as to drive the EACV 74 for regulating the opening of the branch passage 72.

The branch passage 72 and the EACV 74 thus constitute a secondary air supplier 80 for supplying secondary air in proportion to the opening of the EACV 74. Thus, the engine 16 has the branch passage (secondary air passage) 72, that bypasses the throttle valve 50, at the air intake pipe 46 connecting to the intake manifold 52 and the EACV (secondary air control valve) 74 which regulates the opening of the branch passage 72.

The throttle valve 50 is connected to an actuator (stepper motor) 82. The actuator 82 is connected to the ECU 22. The ECU 22 calculates a current command value proportional to the output of the throttle lever position sensor 30 and supplies it to the actuator 82 through a drive circuit (not shown) so as to regulate the throttle opening or position TH.

More specifically, the actuator 82 is directly attached to a throttle body 50*a* housed in the throttle valve 50 with its rotating shaft (not shown) oriented to be coaxial with the throttle valve shaft. In other words, the actuator 82 is attached to the throttle body 50*a* directly, not through a linkage, so as to simplify the structure and save mounting space. Thus, in this embodiment, the push cable is eliminated and the actuator 82 is directly attached to the throttle body 50*a* for driving the throttle valve 50.

The engine 16 is provided in the vicinity of the intake valves 54 and the exhaust valves 68 with a variable valve timing system 84. When engine speed and load are relatively high, the variable valve timing system 84 switches the valve open time and lift to relatively large values (Hi V/T). When the engine speed and load are relatively low, it switches the valve open time and lift to relatively small values (Lo V/T).

The exhaust system and the intake system of the engine 16 are connected by EGR (exhaust gas recirculation) passages 86 provided therein with EGR control valves 90. Under predetermined operating conditions, a portion of the exhaust gas is returned to the air intake system.

The actuator 82 is connected to a throttle position sensor 92 responsive to rotation of the throttle shaft for outputting a signal proportional to the throttle opening or position TH. A manifold absolute pressure sensor 94 is installed downstream of the throttle valve 50 for outputting a signal proportional to the manifold absolute pressure PBA in the air intake pipe (engine load). In addition, an atmospheric air pressure sensor 96 is installed near the engine 16 for outputting a signal proportional to the atmospheric air pressure PA.

An intake air temperature sensor 100 installed downstream of the throttle valve 50 outputs a signal proportional to the intake air temperature TA. A first temperature sensor 102*a* and a second temperature sensor 102*b* each installed at cooling passages (not shown) connected to the water inlet (not shown) via a thermostat (not shown) of the left and right cylinder banks, output signals indicative of the temperature at those locations, and a third temperature sensor 102*c* installed in the exhaust manifolds 70 of one of the left and right cylinder banks outputs a signal indicative of the engine temperature TOH and the engine coolant temperature TW. Thus, the three temperature sensors 102*a*, 102*b* and 102*c* function as the sensors for detecting the engine temperature TOH and the engine coolant temperature TW.

$O_2$ sensors 110 installed in the exhaust manifolds 70 output signals reflecting the oxygen concentration of the exhaust gas. A knock sensor 112 installed at a suitable location on the cylinder block 104 outputs a signal related to knock.

Figure 4:
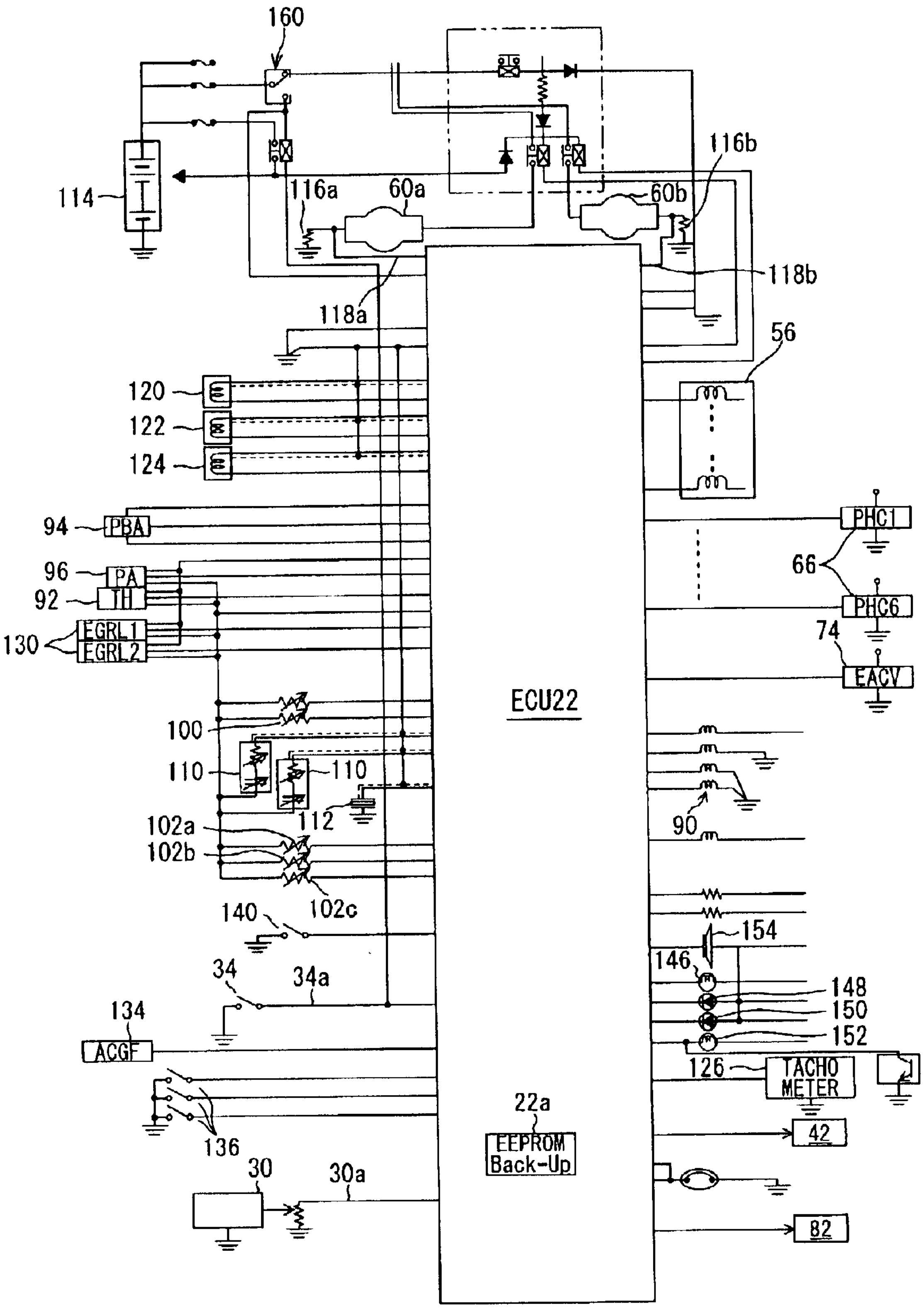
FIG. 4 is a block diagram setting out the particulars of inputs/outputs to and from the electronic control unit (ECU) shown in FIG. 1.

The explanation of the outputs of the sensors and the inputs/outputs to/from the ECU 22 will be continued with reference to FIG. 4. Some sensors and signals lines do not appear in FIG. 3.

The motors of the fuel pumps 60*a* and 60*b* are connected to an onboard battery 114 and detection resistors 116*a* and 116*b* are inserted in the motor current supply paths. The voltages across the resistors are input to the ECU 22 through signal lines 118*a* and 118*b*. The ECU 22 determines the amount of current being supplied to the motors from the voltage drops across the resistors and uses the result to discriminate whether any abnormality is present in the fuel pumps 60*a* and 60*b*.

TDC (top dead center) sensors 120 and 122 and a crank angle sensor 124 are installed near the engine crankshaft for producing and outputting to the ECU 22 cylinder discrimination signals, angle signals near the top dead centers of the pistons, and a crank angle signal once every 30 degrees. The ECU 22 calculates the engine speed NE from the output of the crank angle sensor. Lift sensors 130 installed near the EGR control valves 90 produce and send to the ECU 22 signals related to the lifts (valve openings) of the EGR control valves 90.

The engine 16 is connected with an alternator (ACG; whose F terminal is shown as "ACGF" in the figure) 134 and its output (generated alternating current) is inputted to the ECU 22.

Three hydraulic (oil pressure) switches 136 installed in the hydraulic circuit (not shown) of the variable valve timing system 84 produce and output to the ECU 22 a signal related to the detected hydraulic pressure. A hydraulic switch 140 installed in the hydraulic circuit (not shown) of the engine 16 produces an OFF-signal (L level signal) when the hydraulic pressure is equal to or greater a predetermined value and an ON-signal (H level signal) when the hydraulic pressure becomes less than the predetermined value. The signal (output) of the hydraulic switch is sent to the ECU 22.

The ECU 22, which is composed of a microcomputer as mentioned earlier, is equipped with an EEPROM (electrically erasable and programmable read-only is memory) 22*a* for back-up purposes. The ECU 22 uses the foregoing inputs to carry out the checking of overheat, hydraulic pressure abnormality, etc, and if happened, it turns on any of warning lamps 146, 148, 150 and 152 and sounds a buzzer 154 to warn the operator.

The operation of the illustrated intake manifold leakage detection system of an internal combustion engine will now be explained.

Figure 5:
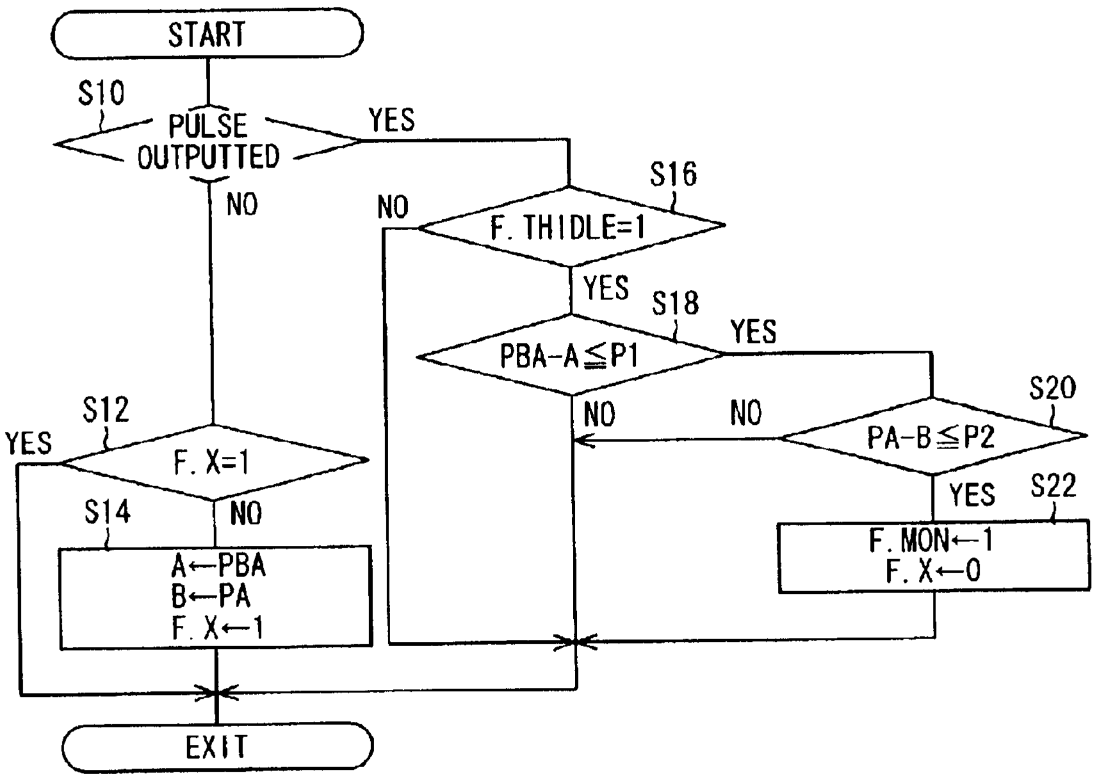
FIG. 5 is a flow chart showing the operation of the system illustrated in FIG. 1, more particular the operation to determine the possibility of intake manifold leakage and the intake manifold should accordingly be monitored.

FIG. 5 is a flow chart showing the operation of the system illustrated in FIG. 1, more particular the operation to determine the possibility of intake manifold leakage and it should accordingly be monitored. The illustrated program is executed when an ignition switch (indicated by reference numeral 160 in FIG. 4) is turned to the ACC position whereafter it is looped once every 100 msec.

The program begins in S10 in which it is determined whether the pulses are outputted from the crank angle sensor 124, in other words it is determined whether the engine 16 starts rotation.

When the result is negative, the program proceeds to S12 in which it is determined whether the bit of a flag F.X is set to 1. Since the bit of the flag has initially been reset to 0, the result in the first program loop is normally negative and the program proceeds to S14 in which the detected manifold absolute pressure PBA (indicative of the pressure in the intake manifold 52, i.e., the intake manifold pressure) is renamed A, i.e., the manifold absolute pressure PBA is detected and stored in memory (memorized). At the same time, the detected atmospheric pressure PA is renamed B, i.e., the atmospheric pressure PA is detected and stored in memory (memorized), and the bit of the flag F.X is set to 1.

In a next program loop, the result in S10 is normally negative and the program proceeds to S12 where the result is affirmative and skips S14. In this way, to set the bit of the flag F.X to 1 indicates that detection and memorization of the manifold absolute pressure PBA, etc., before the engine 16 starts rotation has been completed.

When the engine 16 starts rotation, the result in S10 becomes affirmative and the program proceeds to S16 in which it is determined whether the bit of a flag F.THIDLE is set to 1. The bit of this flag is set to 1 in a routine (not shown) when the throttle valve 50 is at a fully-closed position (precisely when it is at a position slightly opened from the fully-closed position so as to avoid valve sticking). The determination of this step amounts for determining whether the throttle valve 50 is closed.

when the result is negative, the program is immediately terminated. On the other hand, when the result is affirmative, the program proceeds to S18 in which it is determined whether a difference between the manifold absolute pressure (indicative of the intake manifold pressure) PBA detected at this program loop and the value A is equal to or smaller than a predetermined first value P1, more precisely it is determined whether the difference is equal to or smaller than P1 in absolute value. Thus, the pressure in the intake manifold 52 is detected when the throttle valve is closed after the engine 16 has started rotation (i.e., after the engine 16 has started), and it is determined whether the change (difference) from the intake manifold pressure before the engine 16 starts rotation is, in absolute value, equal to or smaller than the predetermined first value P1.

When the result in S18 is negative, the program is immediately terminated. On the other hand, when the result is affirmative, the program proceeds to S20 in which it is determined whether a difference between the atmospheric pressure PA detected at this program loop and the value B is equal to or smaller than a predetermined second value P2, more precisely it is determined whether the difference is equal to or smaller than P2 in absolute value. Thus, the atmospheric pressure is detected when the throttle valve is closed after the engine 16 has started rotation, and it is determined whether the change (difference) from the atmospheric pressure before the engine 16 starts rotation is, in absolute value, equal to or smaller than the predetermined second value P2.

When the result in S20 is negative, the program is immediately terminated. On the other hand, when the result is affirmative, the program proceeds to S22 in which the bit (initially 0) of a flag F.MON is set to 1 to indicate that the intake manifold may possibly leaks and should therefore be monitored. In addition, the bit of the flag F.X is reset to 0.

Figure 6:
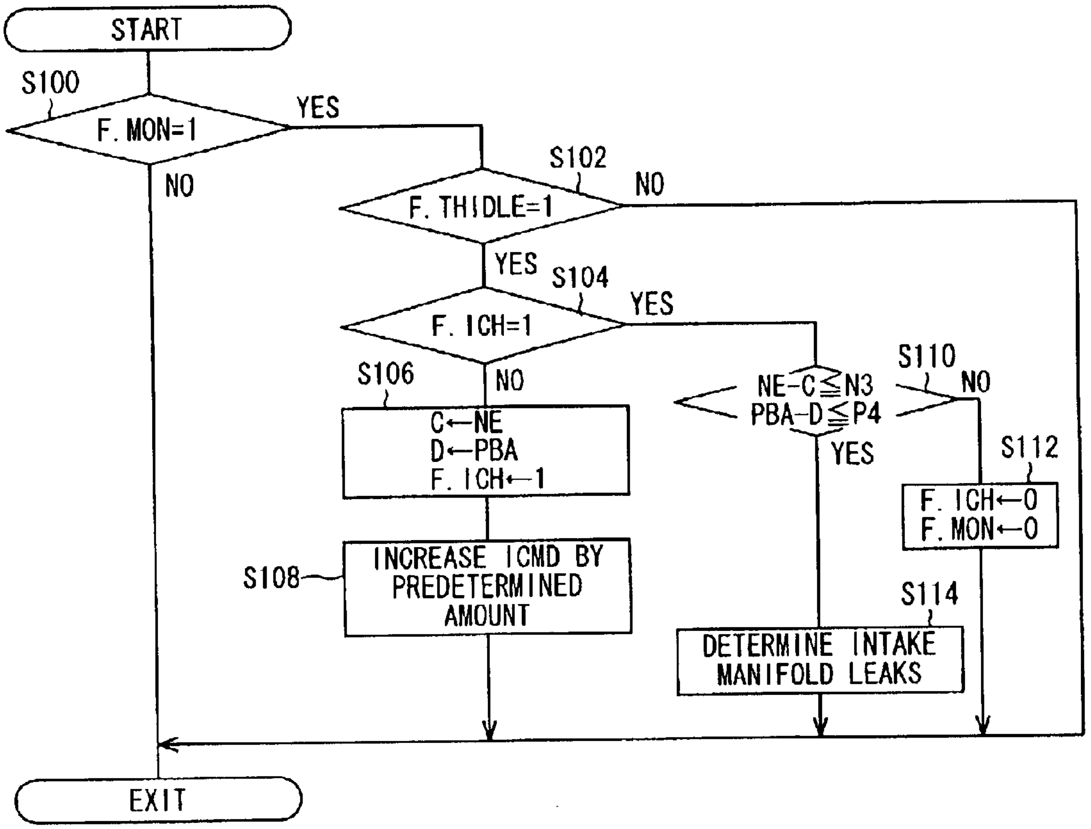
FIG. 6 is a flow chart showing the operation to detect or monitor the intake manifold leakage when it is determined that the intake manifold should be monitored.

FIG. 6 is a flow chart showing the operation to detect or monitor the intake manifold leakage when it is determined that the intake manifold should be monitored. The illustrated program is also executed when the ignition switch is turned to the ACC position whereafter it is looped once every 100 msec.

In the system according to this embodiment, when the changes in the absolute manifold pressure PBA and the atmospheric pressure PA before and after the engine 16 starts rotation, are small, it is determined that the intake manifold may possibly leaks and should be monitored. Specifically, as will be explained later, the opening of the branch passage (secondary air passage) 72 is changed and the changes in the pressure, etc., before and after the opening is changed, are calculated and based thereon, it is determined whether the intake manifold 52, in fact, leaks.

The program begins in S100 in which it is determined whether the bit of the flag F.MON is set to 1 and when the result is negative, the program is immediately terminated. On the other hand, when the result is affirmative, the program proceeds to S102 in which it is determined whether the bit of the flag F.THIDLE is set to 1. This amounts for determining whether the throttle valve 50 is closed.

When the result is negative, the program is immediately terminated. When the result is affirmative, the program proceeds to S104 in which it is determined whether the bit of a flag F.ICH is set to 1. Since the bit of the flag has initially been reset to 0, the result is normally negative and the program proceeds to S106 in which the detected engine speed NE (before the opening of the passage 72 is changed) is renamed C (i.e., is detected and stored in memory) and the detected manifold absolute pressure PBA (before the opening of the passage 72 is changed) is renamed D (i.e., is detected and stored in memory). At the same time, the bit of the flag F.ICH is set to 1. To set the bit of this flag indicates that detection and memorization of the detected engine speed NE, etc., before the opening of the passage 72 is changed has been completed.

The program then proceeds to S108 in which the current command value ICMD to be supplied to the EACV 74 is increased (changed) by a predetermined amount. In other words, at the situation where the throttle valve 50 is closed, the opening of the branch passage 72 is changed in the opening direction by the predetermined amount to change the air flow passing and flowing the intake manifold 52.

In a next program loop, when the program proceeds, via S100 to S102, to S104 in which the result becomes affirmative and proceeds to S110 in which it is determined whether a difference between the engine speed NE detected at this program loop (after the opening of the passage 72 is changed) and the value C, in other words, it is determined whether the change of the engine speeds before and after the opening of the passage 72 is changed, is equal to or smaller than a predetermined third value N3 (more precisely it is determined whether the change is equal to or smaller than N3 in absolute value), and a difference between the manifold absolute pressure PBA detected at this program loop (after the opening of the passage 72 is changed) and the value D, in other words, it is determined whether the change of the intake manifold pressures before and after the opening of the passage is changed, is equal to or smaller than a predetermined fourth value P4 (more precisely it is determined whether the change is equal to or smaller than P4 in absolute value).

When the result in S110 is negative, it is determined that the intake manifold 52 is normal and does not leaks and the program proceeds to S112 in which the bits of the flags F.ICH and F.MON are reset to 0 and the program is terminated.

On the contrary, when the result in S110 is affirmative, the program proceeds to S114 in which it is determined that the intake manifold 52, in fact, leaks, i.e., the intake manifold 52 is not air-tight condition and has a leakage(s) in junction(s) from which air enters. At the same time, any of the aforesaid warning lamps 146, 148, 150 and 152 is turned on and/or sound the buzzer 154 to warn the operator.

Having been configured in the foregoing manner, the system according to the embodiment can detect the leakage of the intake manifold 52 accurately in a simple configuration, without need to install a pressure sensor in each of the cylinders to detect the in-cylinder pressure.

It should be noted in the above that, although the changes of pressure and engine speed is determined by calculating the differences, ratios between the pressures and engine speeds can instead by used.

The embodiment is thus configured to have a system for detecting leakage of an intake manifold 52 of an internal combustion engine 16 having a secondary air passage 72, bypassing a throttle valve 50, at an air intake pipe 46 connecting to the intake manifold 52 and a secondary air control valve 74 which regulates opening of the secondary air passage, comprising: engine starting determining means (ECU 22, S10) for determining whether the engine starts rotation; pressure detecting means (ECU 22, S14) for detecting intake manifold pressure (manifold absolute pressure PBA; A) and atmospheric pressure PA (B) when the engine is determined not to start rotation; first change determining means (ECU 22, S16, S18) for detecting the intake manifold pressure when the throttle valve is closed after the engine is determined to start rotation and for determining whether a change (difference) from the intake manifold pressure detected before the engine is determined to start rotation, is equal to or smaller than a predetermined first value P1; second change determining means (ECU 22, S16, S18) for detecting the atmospheric pressure when the throttle valve is closed after the engine is determined to start rotation and for determining whether a change (difference) from the atmospheric pressure detected before the engine is determined to start rotation is equal to or smaller than a predetermined second value P2; manifold leakage possibility determining means (ECU 22, S22) for determining that the intake manifold may possibly leak when the change from the intake manifold pressure detected before the engine is determined to start rotation is equal to or smaller than the predetermined first value and the change from the atmospheric pressure detected before the engine is determined to start rotation is equal to or smaller than the predetermined second value; third change determining means (ECU 22, S100–S110) for changing the opening of the secondary air passage by the secondary air control valve when it is determined that the intake manifold may possible leak and for determining whether a change of speed of the engine NE before and after the opening is changed, is equal to or smaller than a predetermined third value N3 and a change of the intake manifold pressure before and after the opening is changed, is equal to or smaller than a predetermined fourth value P4; and manifold leaking determining means (ECU 22, S114) for determining that the intake manifold leaks when the change of speed of the engine is equal to or smaller than the predetermined third value and the change of the intake manifold pressure is equal to or smaller than the predetermined fourth value.

In the system, the third change determining means determines whether the change of speed of the engine is equal to or smaller than the predetermined third value and the change of the intake manifold pressure is equal to or smaller than the predetermined fourth value, when the throttle valve is closed (ECU 22, S102).

In the system, the first change determining means calculates the change by obtaining differences between the intake manifold pressures detected before and after the engine is determined to start rotation, the second change determining means calculates the change by obtaining a difference between the atmospheric pressures detected before and after the engine is determined to start rotation, and the third change determining means calculates the changes by obtaining each difference of the speed of the engine and the intake manifold pressures before and after the opening is changed.

It should also be noted that, although the invention has been explained with reference to an embodiment of an outboard motor, the invention is not limited in application to an outboard motor but can also be applied to an inboard motor.

The entire disclosure of Japanese Patent Application No. 2001-315853 filed on Oct. 12, 2001, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for detecting leakage of an intake manifold of an internal combustion engine having a secondary air passage, bypassing a throttle valve, at an air intake pipe connecting to the intake manifold and a secondary air control valve which regulates opening of the secondary air passage, comprising:

engine starting determining means for determining whether the engine starts rotation;

pressure detecting means for detecting intake manifold pressure and atmospheric pressure when the engine is determined not to start rotation;

first change determining means for detecting the intake manifold pressure when the throttle valve is closed after the engine is determined to start rotation and for determining whether a change from the intake manifold pressure detected before the engine is determined to start rotation, is equal to or smaller than a predetermined first value;

second change determining means for detecting the atmospheric pressure when the throttle valve is closed after the engine is determined to start rotation and for determining whether a change from the atmospheric pressure detected before the engine is determined to start rotation is equal to or smaller than a predetermined second value;

manifold leakage possibility determining means for determining that the intake manifold may possibly leak when the change from the intake manifold pressure detected before the engine is determined to start rotation is equal to or smaller than the predetermined first value and the change from the atmospheric pressure detected before the engine is determined to start rotation is equal to or smaller than the predetermined second value;

third change determining means for changing the opening of the secondary air passage by the secondary air control valve when it is determined that the intake manifold may possible leak and for determining whether a change of speed of the engine before and after the opening is changed, is equal to or smaller than a predetermined third value and a change of the intake manifold pressure before and after the opening is changed, is equal to or smaller than a predetermined fourth value; and manifold leaking determining means for determining that the intake manifold leaks when the change of speed of the engine is equal to or smaller than the predetermined third value and the change of the intake manifold pressure is equal to or smaller than the predetermined fourth value.

2. A system according to claim 1, wherein the third change determining means determines whether the change of speed of the engine is equal to or smaller than the predetermined third value and the change of the intake manifold pressure is equal to or smaller than the predetermined fourth value, when the throttle valve is closed.

3. A system according to claim 1, wherein the first change determining means calculates the change by obtaining a difference between the intake manifold pressures detected before and after the engine is determined to start rotation.

4. A system according to claim 1, wherein the second change determining means calculates the change by obtaining a differences between the atmospheric pressures detected before and after the engine is determined to start rotation.

5. A system according to claim 1, wherein the third change determining means calculates the changes by obtaining each difference of the speed of the engine and the intake manifold pressures before and after the opening is changed.

6. A system according to claim 1, wherein the engine is an engine for outboard motor.

7. A method of detecting leakage of an intake manifold of an internal combustion engine having a secondary air passage, bypassing a throttle valve, at an air intake pipe connecting to the intake manifold and a secondary air control valve which regulates opening of the secondary air passage, comprising the steps of:

determining whether the engine starts rotation;

detecting intake manifold pressure and atmospheric pressure when the engine is determined not to start rotation;

detecting the intake manifold pressure when the throttle valve is closed after the engine is determined to start rotation and for determining whether a change from the intake manifold pressure detected before the engine is determined to start rotation, is equal to or smaller than a predetermined first value;

detecting the atmospheric pressure when the throttle valve is closed after the engine is determined to start rotation and for determining whether a change from the atmospheric pressure detected before the engine is determined to start rotation is equal to or smaller than a predetermined second value;

determining that the intake manifold may possibly leak when the change from the intake manifold pressure detected before the engine is determined to start rotation is equal to or smaller than the predetermined first value and the change from the atmospheric pressure detected before the engine is determined to start rotation is equal to or smaller than the predetermined second value;

changing the opening of the secondary air passage by the secondary air control valve when it is determined that the intake manifold may possible leak and determining whether a change of speed of the engine before and after the opening is changed, is equal to or smaller than a predetermined third value and a change of the intake manifold pressure before and after the opening is changed, is equal to or smaller than a predetermined fourth value; and determining that the intake manifold leaks when the change of speed of the engine is equal to or smaller than the predetermined third value and the change of the intake manifold pressure is equal to or smaller than the predetermined fourth value.

8. A method according to claim 7, wherein the step of third change determining determines whether the change of speed of the engine is equal to or smaller than the predetermined third value and the change of the intake manifold pressure is equal to or smaller than the predetermined fourth value, when the throttle valve is closed.

9. A method according to claim 7, wherein the step of first change determining calculates the change by obtaining a difference between the intake manifold pressures detected before and after the engine is determined to start rotation.

10. A method according to claim 7, wherein the step of second change determining calculates the change by obtaining a differences between the atmospheric pressures detected before and after the engine is determined to start rotation.

11. A method according to claim 7, wherein the third change determining calculates the changes by obtaining each difference of the speed of the engine and the intake manifold pressures before and after the opening is changed.

12. A method according to claim 7, wherein the engine is an engine for outboard motor.

* * * * *